Sept. 6, 1960      T. E. MYERS      2,951,817

VARIABLE RESISTANCE MATERIAL

Filed July 28, 1959

POLYVINYL CHLORIDE (PLIABLE) WITH CONDUCTIVE FILLER

INVENTOR.

Thomas E. Myers

BY

Bacon & Thomas

ATTORNEYS ated Sept. 6, 1960

2,951,817
VARIABLE RESISTANCE MATERIAL

Thomas E. Myers, Box 560, Route #1, Bittersweet Drive, St. Charles, Ill.

Filed July 28, 1959, Ser. No. 830,030

10 Claims. (Cl. 252—511)

This invention relates to variable resistance material, and particularly to material comprising a body of pliable material, the electrical resistance of which changes throughout a very wide range of values in response to very small distortions or stresses.

This application is a continuation-in-part of my copending application Serial No. 626,112, filed December 4, 1956, now abandoned, and entitled "Variable Resistance Material."

More specifically, the invention comprises a variable resistance material consisting of a body of thermoplastic polyvinyl chloride of a soft, rubbery consistency, and a filler of granular conductive material dispersed throughout the polyvinyl chloride body. Suitable filler may be either precipitated manganese dioxide or microphone carbon granules, all as will be described in more detail later. It has been found that when either of these materials are incorporated in the body of pliable polyvinyl chloride, the resultant body exhibits extremely high electrical resistance when unstressed and responds to light pressures or slight distortions of the body to cause the resistance thereof to drop rapidly to extremely low values.

The resinous material of the body is preferably a plasticized polyvinyl chloride, with sufficient plasticizer to render it readily pliable and distortable and quite soft. The quantity of plasticizer, of course, predetermines the hardness or pliability of the material and the material may be formed to any desired degree of plasticity within reasonable limits. An unplasticized rigid body is not operable and is not contemplated. It is obvious that the more nearly rigid the body is the greater the pressure necessary to produce a given distortion, whereas a more pliable body will be distorted the same amount under much smaller pressures or forces. Hereafter, in this specification and in the claims, the term "elastomeric" will be employed to define the physical characteristics of the finished body of material. That term will be employed to define a body that can be readily distorted through wide ranges and which will return to its original size and shape upon release. The term is intended to define physical characteristics similar to rubber and is considered to be practically synonymous with "rubber-like."

In one form the filler material is precipitated manganese dioxide, which is extremely fine granular powdered material. A conventional method of preparing manganese dioxide is to precipitate the same from a solution containing a manganese compound. Such methods of preparing the material are well known and need not be described in any further detail. Hereinafter, reference will be made merely to "precipitated manganese dioxide" and it is is understood that the term is intended to describe a dry, powdery material of that composition and having the same characteristics. Such a material consists of extremely small granules of manganese dioxide.

As an alternative filler for the polyvinyl chloride I may use a material that will be hereinafter referred to as "microphone carbon granules." Such material is well known in the art and is commonly and conventionally used in telephone transmitters and other microphones of general utility. The general characteristics and manner of producing microphone carbon granules is described in both the First and Second Editions of "Industrial Carbon," by Charles L. Mantell, first published in 1928 and revised in 1946. Pages 374–377 of the First Edition and pages 320 and 321 of the Second Edition describe the material and point out that it is produced from petroleum coke or selected coals by electrically calcining the material to the desired degree of resistivity, vacuum treating the same, and grinding and sifting the calcined material to select particles passing 60 to 120 mesh screens, as desired. Reference hereinafter to "microphone carbon granules" will be understood to refer to such material.

The manganese dioxide powder is normally of unusually high electrical resistance and may even be termed a "semi-conductor." The microphone carbon granules are also of normally high electrical resistance. Hereinafter, applicant will use the term "conductive" to describe granules having the electricity-conducting characteristics of the manganese dioxide and microphone carbon granules described above.

The polyvinyl chloride resin is normally a good electrical insulating material and has a melting point of about 170° C.

When a body of variable resistance material is made as indicated herein from the material specified above, it has been found that distortion of the body, such as by twisting or by applying compressive forces thereto, reduces the resistance of the material from a value that may be considered infinite for all practical purposes, to an extremely low value, much lower than the resistance of either the polyvinyl chloride alone or the filler material alone.

Any electrical circuit having a resistance of 200 megohms or more is normally considered to be an "open" circuit since 200 megohms resistance is, for all practical purposes, an infinite resistance to ordinary voltages. A relatively small body of the material of the present invention, when unstressed, exhibits electrical resistance in excess of 200 megohms but when such a small body of the material is compressed only a few thousandths of an inch, its resistance drops rapidly to values of the order of 100 ohms or less. Such compression can be accomplished by pressures of only a few grams. The ratio of the resistance of the material when unstressed to the resistance of the material when placed under moderate pressure attains values of one million to one and greater.

Among the unobvious advantages of the variable resistance material of the present invention are its non-sensitivity to temperature changes or changes in humidity. Its change in resistance for a given distortion or pressure remains substantially the same throughout a temperature range extending from many degrees below zero centigrade up to substantially the melting point of the polyvinyl chloride material itself. Furthermore, the variable resistance material is not affected by changes in humidity and is normally resistant to oil and most acids and alkalis. As will be pointed out hereinafter, the stress-resistance characteristics of the material are such that, within certain ranges, the resistance varies substantially linearly with respect to pressure or distortion.

As a further feature of the invention, it has been found that the method of making variable resistance material may be varied to render the material even more sensitive. In producing the material of the present invention it is only necessary to melt a supply of polyvinyl chloride resin of the desired degree of plasticity and mix therein a quantity of either the manganese dioxide or microphone carbon granules described above. It has been found that one part by weight of the polyvinyl chloride and two parts by weight of manganese dioxide powder exhibits all of the characteristics of the invention to a marked degree while the lower useful limit is approximately 2 parts by weight of the polyvinyl chloride to 1 part by weight of manganese dioxide. The proportions may be varied, however, within rather wide limits, with the upper useful limit being about 5 parts of manganese dioxide to 1 part of polyvinyl chloride, by weight. The sensitivity of the material is increased by increasing the quantity of manganese dioxide powder. In those cases where microphone carbon granules are employed as the filler material, I prefer to use about one part by weight of carbon granules to one part by weight of polyvinyl chloride, although the useful range of proportions is generally the same as for manganese dioxide. The sensitivity of the variable resistance material may obviously be altered by changes in the relative proportions of resin and conductive filler material.

While the relative proportions of resin and conductive filler material may be varied within wide limits, the proportion of filler material must not be so high that it occupies substantially all of the space within the body for under such conditions the body would be substantially rigid, with all of the particles of the filler material bearing against each other and it would not be distortable or in any sense elastomeric. The individual particles must be sufficiently spaced so that the resin material will function as a decoherer to again separate the particles when pressure is released.

The sensitivity and responsiveness of the resistance material may be further increased by "electrostatically polarizing" the granular particles during forming of the material. For example, a quantity of pliable polyvinyl chloride may be melted and the desired quantity of granular conductive filler incorporated therein while the resin is still in a molten state. The resin is then maintained in a molten state while an electrostatic charge is applied thereto across opposite faces of the body of material and that charge is maintained while the material cools and hardens. Bodies of variable resistance material formed in this manner exhibit a marked increase in sensitivity, as will be described in more detail later. It is believed that the production of an electrostatic field in the cooling material has the effect of orienting the individual particles of the conductive filler with the electrostatic field so that each particle aligns its most sensitive electrical axis with the faces of the body across which the electrostatic field is impressed. Reference hereinafter to variable resistance material wherein the particles are "electrostatically oriented" or "polarized" will be deemed to have reference to the type of orientation described above. It has been found that an electrostatic charge of the order of 50,000 volts, employed as described above, has a very marked effect on the sensitivity of the product but voltages within a wide range above and below said 50,000 volts produce a material increase in sensitivity.

It is therefore an object of this invention to provide a variable resistance material responsive to extremely small stresses to effect a large change in the electrical resistance thereof.

Another object of the invention is to provide a material as set forth above wherein its electrical resistance, when unstressed, is substantially infinite and which may be reduced, by small stresses, to substantially zero.

Still another object of this invention is to provide a variable resistance material comprising a pliable body having conductive granules incorporated therein and wherein the conductive granules are electrostatically oriented in the body.

A further object of the invention is to provide a novel method of preparing and producing a variable resistance material.

A still further object of the invention is to provide a variable resistance material of uniform characteristics which is economical to produce and reliable in operation.

An additional object of the invention is to provide a variable resistance device comprising a variable resistance material and means for controllably distorting the same in response to a predetermined function.

Another and additional object is to provide a novel method of making a variable resistance material.

Other objects and advantages will become apparent to those skilled in the art as the description proceeds in connection with the accompanying drawings, wherein.

Figure 1:
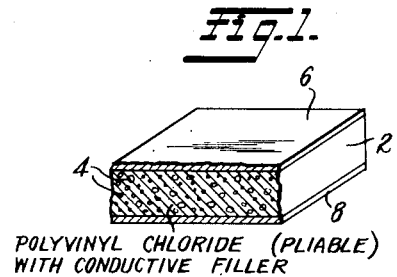
Fig. 1 is a fragmentary and schematic perspective view of a variable resistor embodying the present invention.

Referring first to Fig. 1, numeral 2 identifies a body of pliable polyvinyl chloride material having incorporated and dispersed therein granular material 4, which may be the precipitated manganese dioxide or the microphone carbon granules previously described. Numerals 6 and 8 identify electrically conducting metal plates abutting opposite faces of the body 2. By means of the plates 6 and 8, pressure may be applied to the body to distort the same. A source of electric current may be connected to the plates 6 and 8, respectively, and while no pressure is applied to the body 2 to distort the same, the apparent resistance between the plates 6 and 8 is substantially infinite and no current flows in the circuit. However, when pressure is applied to the plates 6 and 8, tending to move them closer together, the material 2 is distorted sufficiently to reduce its resistance to a point where current will flow between the plates 6 and 8. The reduction of resistance and the amount of current flow is, of course, dependent upon the pressure applied to the plates 6 and 8.

The showing of Fig. 1 is merely an example of how the body 2 of variable resistance material may be employed in combination with conducting means comprising part of an external circuit. The plates 6 and 8 may be adhered to the material 2 or may be left free thereof, if desired. Obviously, other arrangements may be resorted to for distorting the material 2. For instance, a body of the material may be mounted to respond to external motion by being twisted about one of its axes rather than being distorted by direct compression.

Many other arrangements will be obvious to those skilled in the art and many arrangements will be dictated by the mechanical function it is desired to reproduce electrically. The resistance of the material decreases upon any type of distortion thereof.

Figure 2:
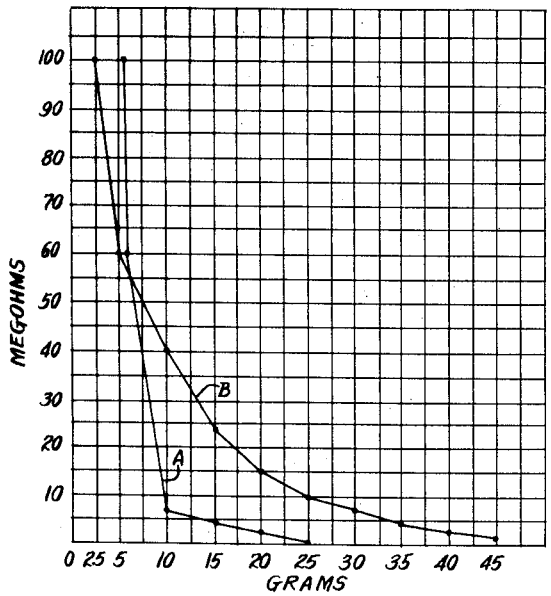
Figs. 2, 3 and 4 are graphs showing the pressure and/or distortion-resistance characteristics of different samples of the material of the present invention.

Fig. 2 is a graph of the pressure-resistance characteristics of samples of the material of the present invention. In the samples tested, which produced the values of Fig. 2, the material was made by mixing one part by weight of melted pliable polyvinyl chloride and three parts by weight of precipitated manganese dioxide and allowing the mixture to cool and harden. After cooling and hardening, the material was cut to a block measuring 1 cm. x 1 cm. x .05". The values plotted on Graph A were observed in testing that sample of the material of the above-described size wherein an electrostatic charge had been placed across the body of material during cooling and hardening thereof. An electrostatic charge of 50,000 volts was used. The values of Graph B were observed in testing a sample of the same size and composition but wherein the particles were not electrostatically polarized or oriented during the cooling and hardening step.

The sample wherein the particles were not oriented by an electrostatic charge (Graph B) exhibited a resistance extremely high when pressures of less than about 2½ grams were applied to opposite faces thereof. In other words, the resistance of the material was practically infinite up to pressures just short of about 2½ grams. At 2½ grams the resistance was measured at 100 megohms. As clearly shown by Graph B, added pressure resulted in reduction of the resistance of the material to a point where the resistance became approximately 2 megohms when the total pressure on the sample was 45 grams. In the other sample wherein the particles were electrostatically polarized or oriented (Graph A), the resistance of the material was extremely high until a pressure of about 5 grams was applied, at which pressure the resistance was measured at 100 megohms. Very slight additional pressure then reduced the resistance rapidly. As shown, the total pressure of 10 grams reduced the resistance of the sample to about 7 megohms and at 25 grams the resistance was extremely low, in fact, less than about 100 ohms.

Figure 3:
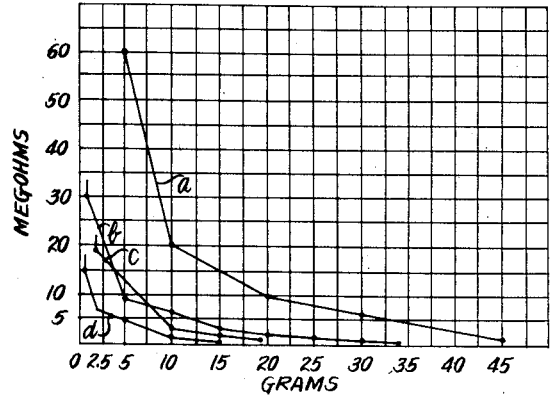
Figure 4:
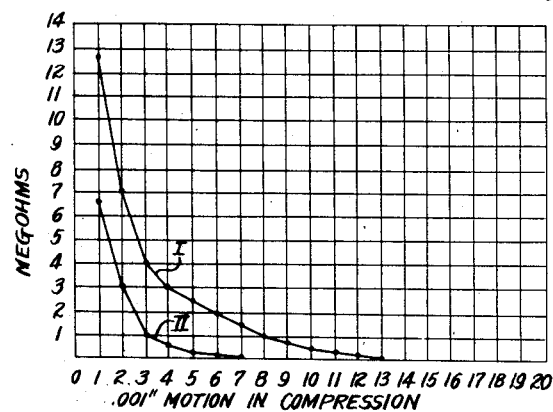

In Fig. 2, and also in Figs. 3 and 4, to be discussed hereafter, the graphs terminate at their lower ends at points closely adjacent the zero resistance line. As shown in the drawings, those points are somewhat above the zero resistance line but the fact is not indicative of the true resistance measured at that pressure since it is impossible to indicate resistance of the order of 100 ohms on the scale employed in these figures. It is to be understood that, in all figures, those points lying closely adjacent the zero resistance line are intended to indicate resistances of the order of 100 ohms.

Fig. 3 indicates the results of tests on samples of the material wherein each sample tested consisted of one part by weight of polyvinyl chloride mixed with two parts by weight of precipitated manganese dioxide in the manner described. Graph "a" was a sample of 1 cm. x 1 cm. x .05" in which the granules were not polarized. Graph "b" shows the results of tests on a sample cut to a size of 1 mm. x 5 mm. x 5 mm. and in which the granules were not polarized. Graph "c" shows the results of tests on a sample cut to 1 cm. x 1 cm. x .025" and in which the particles were polarized under an electrostatic charge of 50,000 volts. Graph "d" shows the results of tests on a sample cut to 1 mm. x .5 mm. x 2.5 mm. and in which the filler material was not polarized. Fig. 3 shows the observed changes in resistance at the different pressures applied to the material.

In Figs. 2, 3 and 4, each of the graphs terminate at an upper point which represents that point at which any appreciable reduction in the pressure on the material resulted in a substantially abrupt change of resistance to values in excess of 200 megohms or, in other words, to substantially infinite resistance.

Fig. 3 illustrates the result of tests on samples of the material wherein one part by weight of polyvinyl chloride was melted and mixed with three parts by weight of manganese dioxide powder, and the resultant product was, in each case, cut to a size of 1 mm. x 5 mm. x 5 mm. Graph I shows the test results on such a samle wherein the filler material was not electrostatically polarized, whereas Graph II shows the result of tests on a sample that was electrostatically polarized while cooling and hardening. In the graphs of Fig. 4 it is to be noted that resistance in megohms is plotted against actual distortion of the material in compression, as measured in thousandths of an inch, rather than in terms of pressure. As is clearly obvious from Fig. 4, the electrostatic polarization of the material results in a product in which the reduction in resistance is more rapid than where the material is not polarized and wherein the extremely low resistance value is reached after considerably less distortion than necessary to reach that same value of resistance in the non-polarized sample.

As will be evident from consideration of all of the graphs shown in Figs. 2, 3 and 4, each graph is of such configuration that it has portions wherein the change in resistance bears a substantially linear relation to the change in pressure and/or dimensional distortion. In many applications, such linear relationship is highly desirable.

Applicant has previously described the production of a variable resistance material wherein microphone carbon granules were employed instead of manganese dioxide powder. In tests on materials made with the microphone carbon granules, none of which was polarized, a sample 1 mm. x 1 mm. x 5 mm. exhibited substantially infinite resistance at pressures below 1 gram. When a pressure of 1 gram was applied to the sample, however, the resistance was then measured at 20,000 ohms. Under a pressure of 2 grams, the same sample exhibited a measured resistance of 800 ohms while 5 grams of pressure reduced the resistance to 400 ohms. A sample of the same material cut to 1 cm. x 1 cm. x .05" exhibited a resistance of 22 megohms under a pressure of 1 gram and substantially infinite resistance at all pressures appreciably below 1 gram. Under a pressure of 2 grams, the resistance was 2,000 ohms, under 4 grams—600 ohms, and under a pressure of 50 grams the resistance was reduced to 110 ohms. A third sample of the same material containing equal parts of polyvinyl chloride and microphone carbon granules was cut to a size of 1 cm. x 1 cm. x .05" and the resistance thereof was measured at different amounts of compression, as measured in thousandths of an inch. The resistance to the sample was substantially infinite until the sample was compressed about one-half of one thousandth of an inch, at which distortion its resistance became 1½ megohms. At one thousandth of an inch compression the resistance was measured at about .25 megohm. Thereafter, the resistance of the sample decreased to a value of about 100 ohms before the total compression of the sample reached two thousandths of an inch.

As will be obvious to those skilled in the art, the smaller the body of material, the smaller will be the actual force necessary to produce a given dimensional distortion and/or reduction in resistance. At the same time, the smaller the body, the less will be its current carrying capacity without destructive heating effects. For example, in a body arranged according to Fig. 1 of the drawings, the change in resistance of the material 2 for a given change in pressure may be increased by decreasing the thickness of the body 2 between plates 6 and 8. At the same time, the current carrying capacity of the arrangement increases in direct proportion to the area of contact between the plates 6 and 8 and the body 2.

The resistance of the material is not dependent on the thickness or surface area and neither is the change of resistance so dependent when the material is compressed or otherwise distorted. The thickness affects only the total movement necessary or total compression that must be placed on the material to effect a given change in resistance. The surface area between the body of material and its conducting electrodes determines the total quantity of current that can be conducted without melting the resin.

Figure 5:
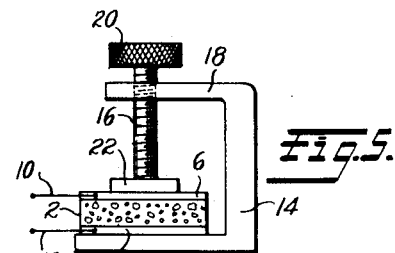
Figs. 5, 6 and 7 are schematic illustrations showing different embodiments of apparatus employing the material of the present invention.

Fig. 5 shows one form of apparatus in which the material of the present invention may be employed. As shown in that figure, the body 2 of material is placed between conductive plates 6 and 8, as previously described, and suitable conductor leads 10 and 12 are respectively connected to the plates 6 and 8. The assembly is mounted on an insulating structure 14 of generally C-clamp configuration. A threaded rod 16 is threaded through the upper arm 18 of frame 14 and is provided with a thumb wheel 20 at its upper end and a pressure pad 22 at its lower end bearing against the conductive plate 6. Obviously, the thumb wheel 20 may be manipulated to regulate the pressure applied to the body 2 and thus predetermine and regulate the resistance between conductors 10 and 12.

Figure 6:
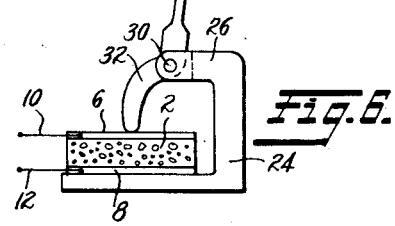
Figure 7:
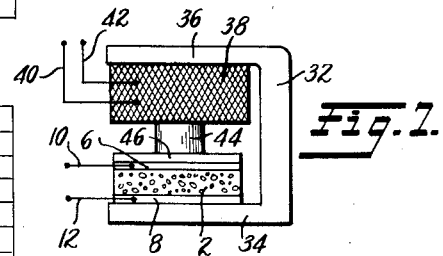

In Fig. 6 like reference numerals indicate identical parts and the variable resistance assembly is shown on a frame member 24 of electrical insulating material having an upper arm 26 to which a feeler 28 is pivoted, at 30. The feeler 28 is provided with a downwardly extending arm 32 bearing against the upper conductor plate 6. Obviously, the feeler 28 may be placed against any mechanically vibrating or cyclically movable structure and will transmit the movements to its arm 32 to thus variably compress and/or release the material 2 to provide resistance between the conductors 10 and 12, which resistance varies in accordance with the movement imparted to the feeler 28. In Fig. 7 a frame member 32 of insulating material is formed of generally C shape and the assembly of variable resistance material and its conductor plates is mounted on the lower arm 34 of the frame. The upper arm 36 of frame 32 has mounted thereon an electromagnetic coil 38 having leads 40 and 42 connected thereto. A movable armature or core 44 extends upwardly into the coil 38 and is provided with a pressure pad 46 at its lower end bearing on the upper conductor plate 6. A variable or other electrical signal may be applied to the conductors 40 and 42, thus causing movement of armature 44 to apply variable pressure to the material 2, in accordance with changes in the signal applied to conductors 40 and 42. Thus the resistance between conductors 10 and 12 is caused to vary in accordance with the applied signal.

The description herein has referred specifically to only precipitated manganese dioxide and microphone carbon as suitable fillers. These are the only fillers applicant has discovered up to now that produce the desired results. However, it is to be understood that, with applicant's teaching in mind, other equivalent filler materials may be discovered.

The material of the present invention may be molded, cut or extruded and may be in the form of sheets, rods or any other desired shape depending upon the use to which it is to be put.

In making the material in accordance with the method herein described, care must be exercised to avoid heating the polyvinyl chloride much above its melting point. If excessive heat is applied to the material it will char or harden and become rigid and useless.

While a limited number of specific embodiments and examples of the invention have been described herein, it will be obvious that the invention encompasses other examples. It is contemplated that the invention encompass all modifications and changes falling fairly within the scope of the appended claims.

I claim:

1. Variable resistance material consisting essentially of a solid body of elastomeric polyvinyl chloride with a granular filler dispersed therein with the granules in non-contacting relation, said filler being selected from the group consisting of precipitated manganese dioxide and microphone carbon granules present in a quantity of from about five times the weight of the polyvinyl chloride to about one-half the weight thereof, such quantities being materially less than the amount necessary to render said body mechanically rigid.

2. Variable resistance material consisting essentially of a solid body of elastomeric polyvinyl chloride with a granular filler of precipitated manganese dioxide dispersed therein with the granules in non-contacting relation and present in a quantity of from about five times the weight of the polyvinyl chloride to about one-half the weight thereof, such quantities being materially less than the amount necessary to render said body mechanically rigid.

3. Variable resistance material consisting essentially of a solid body of elastomeric polyvinyl chloride with a filler of microphone carbon granules dispersed therein with the granules in non-contacting relation and present in a quantity of from about five times the weight of the polyvinyl chloride to about one-half the weight thereof, such quantities being materially less than the amount necessary to render said body mechanically rigid.

4. Variable resistance material consisting essentially of a solid body of elastomeric polyvinyl chloride with a granular filler dispersed therein with the granules in non-contacting relation, said filler being selected from the group consisting of precipitated manganese dioxide and microphone carbon granules, the granules of said filler being electrostatically oriented in said body, in the same direction therein by placing said material in an electrostatic field of several thousand volts and said filler being present in a quantity of from about five times the weight of the polyvinyl chloride to about one-half the weight thereof, such quantities being materially less than the amount necessary to render said body mechanically rigid.

5. Variable resistance material as defined in claim 4 wherein said polyvinyl chloride has a melting point of about 170° F.

6. Variable resistance material as defined in claim 4 wherein said granules comprise at least about one-half the weight of said material.

7. The method of producing a variable resistance material comprising the steps of; melting a body of elastomeric polyvinyl chloride, mixing granules of material therein in quantity of from about five times the weight of the polyvinyl chloride to about one-half the weight thereof, such quantities being less than enough to place said granules in contacting relation, applying an electrostatic charge of several thousand volts across said mixture, and maintaining said charge until said mixture cools and solidifies with said granules therein, said granules being selected from the group consisting of precipitated manganese dioxide and microphone carbon.

8. The method of claim 7 wherein said electrostatic charge is of the order of fifty thousand volts.

9. The method of claim 7 wherein said thermoplastic material is polyvinyl chloride.

10. The method of making a variable resistance material comprising, the steps of; melting a body of elastomeric polyvinyl chloride, mixing therein granules of conductive material selected from the group consisting of precipitated manganese dioxide and microphone carbon, cooling said mixture to solidify said polyvinyl chloride, and limiting the quantity of said granules to a quantity of from about five times the weight of the polyvinyl chloride to about one-half the weight thereof, such quantities being materially less than the amount necessary to render said solidified mixture mechanically rigid.

References Cited in the file of this patent

UNITED STATES PATENTS

| | | |
|---|---|---|
| 1,795,961 | Mucher | Mar. 10, 1931 |
| 2,041,213 | Schellenger et al. | May 19, 1936 |
| 2,414,793 | Becker et al. | Jan. 28, 1947 |
| 2,473,183 | Watson | June 14, 1949 |
| 2,542,808 | Gilman et al. | Feb. 20, 1951 |
| 2,570,856 | Pratt et al. | Oct. 9, 1951 |
| 2,624,822 | Becker | Jan. 6, 1953 |
| 2,631,116 | Fox | Mar. 10, 1953 |
| 2,690,489 | Jarret et al. | Sept. 28, 1954 |
| 2,718,506 | Elleman | Sept. 20, 1955 |
| 2,912,388 | Leahy et al. | Nov. 10, 1959 |